C. H. SHARP.
COMPENSATING TEST PLATE FOR ILLUMINATION MEASUREMENTS.
APPLICATION FILED APR. 9, 1915.
1,185,012.
Patented May 30, 1916.
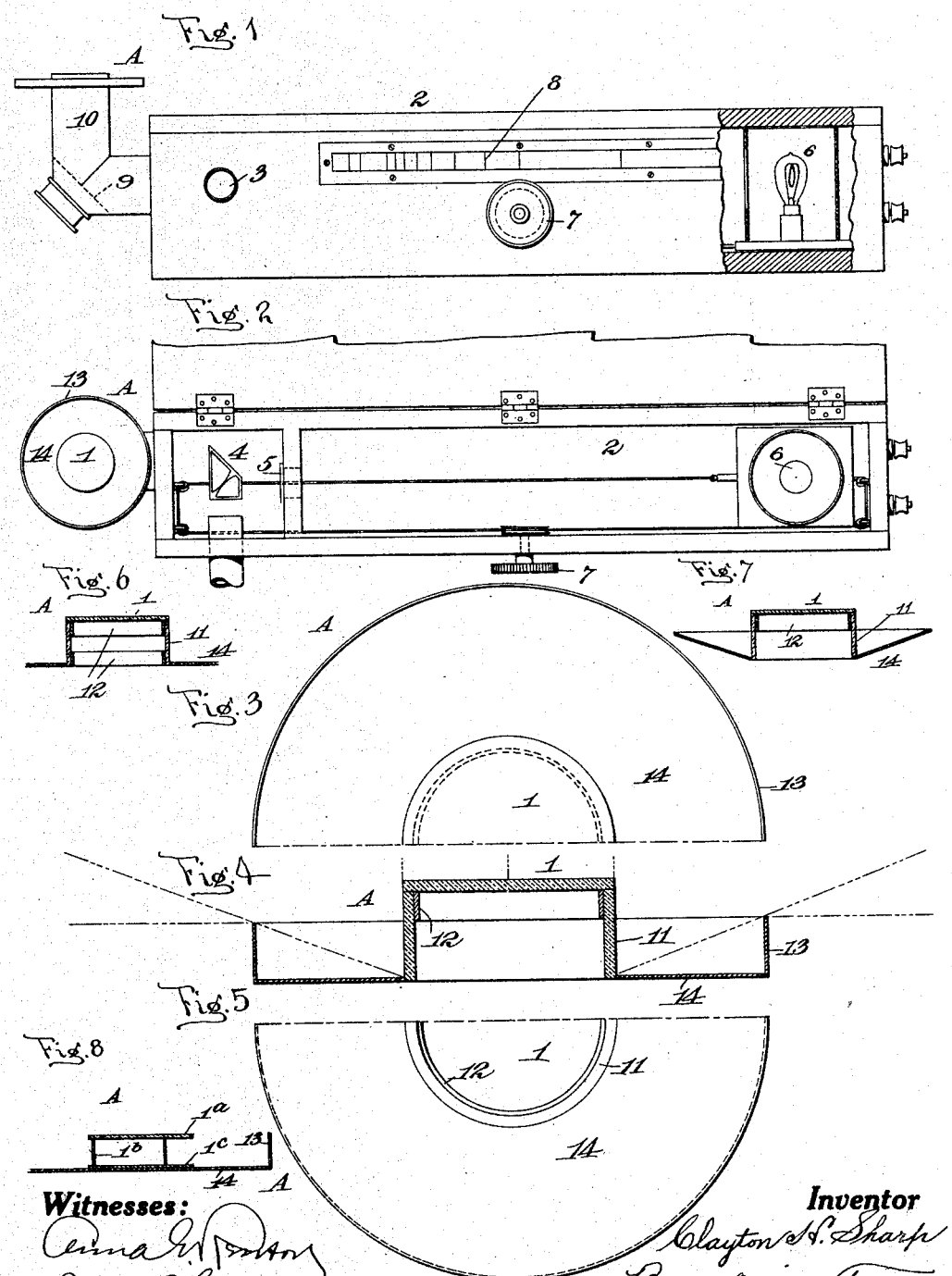

UNITED STATES PATENT OFFICE.

CLAYTON H. SHARP, OF WHITE PLAINS, NEW YORK.

COMPENSATING TEST-PLATE FOR ILLUMINATION MEASUREMENTS.

1,185,012.      Specification of Letters Patent.      Patented May 30, 1916.

Application filed April 9, 1915. Serial No. 20,161.

*To all whom it may concern:*

Be it known that I, CLAYTON H. SHARP, a citizen of the United States, resident of White Plains, Westchester county, State of New York, have invented a certain new and useful Compensating Test-Plate for Illumination Measurements, of which the following is a specification.

This invention relates to improvements in test plates to be used in the measurement of illumination.

Illumination values are measured by observing with a photometric apparatus, the brightness of a plane diffusing plate receiving the illumination to be measured. The apparatus is calibrated by producing on the plate a known illumination. A plate so used will not, however, give correct values of illumination under all circumstances unless it acts as a perfect diffuser of light and obeys the cosine law of Lambert which states that the brightness produced is proportional to the cosine of the angle of incidence of the light.

The objects of this invention are to produce a test-plate which will obey the cosine law of Lambert and which will permit the accurate measurement of illumination irrespective of the angle of incidence of the light. These and further objects will more fully appear from the following specification and accompanying drawings, considered together or separately.

In the drawings Figure 1 is an elevation, partly in section, of a test-plate and a photometer, said test-plate embodying my improved invention; Fig. 2 is a plan view of the same; Fig. 3 is a plan view, on an enlarged scale, of one-half of the test-plate embodying my invention; Fig. 4 is a section through the greatest diameter of the same; Fig. 5 is a bottom view of the same; Fig. 6 is a sectional view of a modification; Fig. 7 is a sectional view of another modification, and Fig. 8 is a sectional view of another modification.

In all views like parts are designated by the same reference characters.

Referring to Figs. 1 and 2, the test-plate A is associated with a photometer 2. The particular photometer illustrated forms no part of the present invention, but is shown as a means wherein my improved test-plate may be used. The photometer illustrated is similar to that disclosed in the patent to Sharp and Millar, No. 960420, dated June 7, 1910.

The photometer illustrated has a sight tube 3, through which the illumination is viewed from a prism 4. The prism permits the viewing of the illumination on a comparison plate 5, which is illuminated by means of a comparison lamp 6. The distance of this lamp from the plate is controlled by means of an actuating knob 7 and a cord running over pulleys, as shown. The distance between the lamp and the plate 5 is measured upon a scale 8. On the side of the sight tube opposite the plate 5 is a mirror 9 supported in an elbow tube 10. At the open end of the tube 10 is the test-plate A (Fig. 1). The test-plate will be illuminated by the light to be measured and the observer can adjust the position of the comparison lamp in relation to the comparison plate so that the two plates, A and 5, will show the same brightness. The distance of the lamp from the comparison plate will then be indicated upon the scale, and the foot candle illumination indicated.

The plate A includes a plane member 1 preferably of translucent white glass roughened on both surfaces. The member 1 is associated with the translucent diffusing ring 11. This ring is preferably made of translucent white glass also preferably roughened on both surfaces.

12 is a sleeve of opaque material.

13 is a shield of a definite height carried by a suitable opaque supporting plate 14.

The action is as follows: The illumination to be measured falls on the upper side of the member 1. The lower side of this member is viewed normally through the photometric apparatus. Assuming a point source of light, it is known that if the brightness of the plate is proportional to the illumination with the light incident normally, this brightness will be less than the required amount when the angle of incidence is large, due to the excessive loss of light by reflection at these angles. If light be admitted through the ring 11 to the underside of the member 1 in sufficient amount it will compensate for the deficiency in transmitted light through the member 1. It will be observed that at normal incidence, *i. e.* 90° to the plane of the member 1 (see the vertical broken lines in Fig. 4) no light will strike the sides of the diffusing ring 11, hence all of the light will illuminate the member 1. As the angle of incidence of the light on the member 1 increases, more light will pass through the diffusing ring 11. This increase of the light incident on the sides of the diffusing ring 11 increases with the sine of the angle of incidence on the member 1, and by properly proportioning the parts the increase of brightness on the underside of the member 1 may be made such as to compensate at all angles for the deficiency of light transmitted through the member 1. However, theory requires that with 90° incidence on the member 1 the underside of the member must be dark, hence the ring 11 must be shielded from the light which would otherwise reach it under these conditions. For this reason the shield 13 is added. The height of this shield must be at least as great as that of the effective portion of the diffusing ring 11, otherwise the shielding will not be complete. Since with increasing angles of incidence the shadow cast by the shield 13 gradually covers the diffusing ring 11, the characteristics of the member 1 and of the diffusing ring 11 must be so chosen that without the shield 13 there will be over-compensation, which over-compensation is just corrected by the action of the shield 13. The diameter and height of the shield 13 may be chosen so as to accomplish this purpose. I have found in practice that with a shield 13 of a diameter and height substantially as shown in Fig. 4 such that the ray of light following the dotted diagonal line illustrated in that figure falls at an angle of about 20° to the perpendicular of the ring 11, has produced satisfactory results. This angle, of course, can be changed according to different conditions. It is necessary also to prevent any rays of light from below the plane of the member 1 from reaching such member. For this purpose the opaque plate 14 is used as well as for supporting the shield 13. The upper surface of the plate 14 and the inner surface of the shield 13 must be black so as to prevent reflections of light. The plate 14 and shield 13 are not necessarily formed of separate pieces as they may be made a single piece as shown in Fig. 7.

The amount of compensation obtained depends upon the relative transparency of the member 1 and ring 11 and upon their diffusion. If the ring 11 is relatively too opaque, the member 1 will be under-compensated. If the ring is too transparent the member 1 will be over-compensated. In either case the compensation can be adjusted within certain limits to the right amount by substituting sleeves 12 of different widths. The correct sleeve will let in just enough light to supply the deficiency at each angle. The amount of compensation at high angles can be varied by varying the diameter of the shield 13. These adjustments are desirable as practical matters in view of the difficulty in altering the member 1 or diffusing ring 11. Instead of using the sleeve 12 the inner or outer surfaces of the ring 11 may be partly covered with black paint or in any other way or two sleeves may be used as shown in Fig. 6. The use of different materials in the ring 11 enables the compensation effect to be so varied as to be practically perfect at all angles. For example, using a ring of ground glass the compensation can be made relatively large at high angles of incidence on the member 1, whereas a more perfect diffusing material, such as milk glass or opal glass depolished gives a more uniform compensating effect.

The invention may be employed in many ways. For example, instead of employing a transmitting test-plate viewed from the under surface, the test-plate may be viewed on its upper surface by reflected light, the photometric apparatus being placed on the illuminated side of the test-plate.

In the transmitting type of test plate the observer looks toward the side of the plate which is turned away from the illumination to be measured, that is, the reverse side of the plate. The compensating light falls on the reverse side of the plate and the sum of the compensating light plus the transmitted light must at all angles give the viewed side of the plate a brightness which is proportional to the incident illumination on the obverse side of the plate.

In the reflecting type the side of the plate turned toward the illumination is the observed side. The diffusedly reflected light due to the direct illumination plus the compensating light which comes through the test plate from the reverse side must make the obverse or viewed side of the plate bright in proportion to the incident illumination.

As shown in Fig. 8 a plane member $1^a$ of depolished white glass is mounted on slender legs $1^b$ at a suitable distance above a compensating plate $1^c$ the upper surface of which is white and diffusing. The plate $1^c$ is parallel to and of the same size as the member $1^a$ and is supported upon an opaque plate 14 which may or may not be provided with a shield 13. In the embodiment of the invention illustrated in Fig. 8 the action is as follows: The device is placed in position in relation to the photometer so that the member $1^a$ can be viewed from above. When the brightness of the member $1^a$ falls off due to the increased angle of incidence, light penetrates the region below the member $1^a$, and striking the compensating plate $1^c$ is diffusedly reflected to the member $1^a$ from the under side thereof and thereby reinforces the direct illumination of the member.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. A translucent test-plate for measurement of illumination, having means for admitting light to be measured to both sides thereof.

2. A test-plate for measurement of illumination, having a member with a translucent plane surface located in the place where the illumination is to be measured, and means for admitting light to the side of the member opposite the side on which the illumination is to be measured.

3. A test-plate for measurement of illumination, having a translucent body for receiving direct light rays, and a translucent member for admitting diffused light to the body.

4. A test-plate for measurement of illumination having, in combination, a member with a translucent plane surface, and a member with a cylindrical surface to admit light to one side of the member with the plane surface.

5. A test-plate for measurement of illumination, comprising a member with a translucent plane surface and a diffusing ring on the side opposite source of the illumination, said ring admitting light to the side of the plane surface opposite the source of illumination.

6. A test-plate for measurement of illumination, comprising a member with a translucent plane surface, a diffusing ring on one side of said surface, and an opaque sleeve associated with said ring and adjacent to the plane surface.

7. A test-plate for measurement of illumination, having a member with a translucent plane surface, a diffusing ring associated with the said member in combination with, and a screen beyond the perimeter of said ring to prevent over-compensation at high angles of incidence to the member.

8. A test-plate for measurement of illumination having a member with a translucent plane surface, a diffusing ring associated with the said member in combination with, a screen beyond the perimeter of said ring to prevent over-compensation at high angles of incidence to the member, and an opaque sleeve associated with said ring.

9. A test-plate for measurement of illumination having a member with a translucent plane surface, a diffusing ring associated with the said member in combination with a screen beyond the perimeter of said ring to prevent over-compensation at high angles of incidence to the member, and an opaque plate between the ring and the screen.

10. A test-plate for measurement of illumination comprising a member with a translucent plane surface, a diffusing ring, on one side of said surface, in combination with an opaque plate surrounding said diffusing ring and extending beyond the perimeter thereof to prevent over-compensation at high angles of incidence to the member.

11. A translucent test-plate for measurement of illumination, having means for admitting direct light to one side thereof, and means for admitting diffused light to the other side thereof.

12. A translucent test-plate for measurement of illumination, having means for admitting direct light to one side thereof, and means for admitting reflected light to the other side thereof.

13. A translucent test-plate for measurement of illumination, having means for admitting direct light to one side thereof, and means for admitting diffused reflected light to the other side thereof.

14. A test-plate for measurement of illumination, having, in combination, a member with a translucent plane surface, capable of receiving light from a source above such member on both sides thereof, and means for screening said member from direct light from a source below the plane thereof.

15. A test-plate for measurement of illumination, comprising a body of translucent material on one side of which the direct illumination falls, means for indirectly illuminating the reverse side of the body, and means whereby the last mentioned illumination is such that the brightness of the observed side of the plate is proportional to the incident flux density on the side directly exposed to the illumination.

16. A test-plate for measurement of illumination, comprising a body of translucent material on one side of which the direct illumination falls, means for indirectly illuminating the reverse side of the body, and means whereby the last mentioned illumination is such that the brightness of the observed side of the plate is proportional to the incident flux density of the illumination incident upon the side of the body directly exposed to the illumination irrespective of the angle of incidence of the illumination.

17. In a photometer the combination with a comparison source of illumination, of two photometric surfaces, and means for admitting light to be measured to both sides of one of said surfaces.

18. In a photometer the combination with a comparison source of illumination, of two photometric surfaces, one of said surfaces receiving the comparison illumination on one side thereof, the other of said surfaces receiving the illumination to be measured on both sides thereof.

19. In a photometer the combination with a comparison source of illumination, of two photometric surfaces, one of said surfaces receiving the comparison illumination on one side thereof, the other of said surfaces receiving the illumination to be measured on both sides thereof, and means for simultaneously viewing both plates, said means being located between the plates.

This specification signed and witnessed this fifth day of April, 1915.

CLAYTON H. SHARP.

Witnesses:
ROSE PROPPER,
CARRIE E. SLOCUM.

Copies of this patent may be obtained for five cents each, by addressing the "Commissioner of Patents, Washington, D. C."